US006728961B1

(12) United States Patent
Velasco

(10) Patent No.: US 6,728,961 B1
(45) Date of Patent: Apr. 27, 2004

(54) METHOD AND SYSTEM FOR DYNAMICALLY LOAD BALANCING A PROCESS OVER A PLURALITY OF PEER MACHINES

(75) Inventor: Gabriel Velasco, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,621

(22) Filed: Mar. 31, 1999

(51) Int. Cl.$^7$ ................................................. G06F 9/00
(52) U.S. Cl. ......................................... 718/105; 717/11
(58) Field of Search .............................. 709/105, 229, 709/717

(56) References Cited

U.S. PATENT DOCUMENTS

| | | | |
|---|---|---|---|
| 5,491,791 A | | 2/1996 | Glowny et al. |
| 5,517,622 A | | 5/1996 | Ivanoff et al. |
| 5,561,769 A | | 10/1996 | Kumar et al. |
| 5,598,566 A | | 1/1997 | Pascucci et al. |
| 5,668,986 A | | 9/1997 | Nilsen et al. |
| 5,826,041 A | * | 10/1998 | Ogus .......................... 709/234 |
| 5,918,021 A | * | 6/1999 | Aditya ........................ 709/235 |
| 5,930,511 A | * | 7/1999 | Hinsley ...................... 717/164 |
| 6,101,616 A | * | 8/2000 | Joubert et al. ................ 714/11 |
| 6,128,279 A | * | 10/2000 | O'Neil et al. ................ 370/229 |
| 6,223,202 B1 | * | 4/2001 | Bayeh ......................... 709/102 |
| 6,433,794 B1 | * | 8/2002 | Beadle et al. ................ 345/700 |

OTHER PUBLICATIONS

Robert Orfali, Client/Server Programming with java and Corba, 1997,John Wiley, Katherine Schowalter, p. 30–33.*

* cited by examiner

Primary Examiner—John Follansbee
Assistant Examiner—Lechi Truong
(74) Attorney, Agent, or Firm—Duke W. Yee; Jeffrey S. LaBaw; Cathrine K. Kinslow

(57) ABSTRACT

A distributed computing environment in which each of a plurality of peer machines includes an interpreter for interpreting methods written in an interpreted language to platform-specific methods. The interpreter, for example, is a Java virtual machine that has been modified to implement the inventive protocol. The protocol dynamically load balances a process as follows. In response to receiving a new method for interpretation at a first peer machine, the machine profiles the new method to determine whether there is an advantage to sending the new method to another peer machine for interpretation. If there is an advantage to having the new method interpreted elsewhere, the method and its protocol are packaged and sent to a given subset of the peer machines. These machines then bid to interpret the new method on behalf of the first peer machine. The winning machine then interprets the method on behalf of first peer machine, and then returns the results back to the first peer machine.

31 Claims, 5 Drawing Sheets

COMPUTER 1

COMPUTER 3

COMPUTER 2

METHOD AND SYSTEM FOR DYNAMICALLY LOAD BALANCING A PROCESS OVER A PLURALITY OF PEER MACHINES

BACKGROUND OF THE INVENTION

1. Technical Field

The present invention relates generally to distributed computer processing and, in particular, to a protocol for creating a dynamic pool of computational resources that are made available to other users and computers in a networked computer environment.

2. Description of the Related Art

In any organization with large numbers of personal computers, a large percentage of those computers are sitting idle for a significant part of the day. In recognition of this fact, it has been proposed in the prior art to add the computational resources of those computers to a pool and to make those resources available to other users and computers. This "clustering" technique theoretically enables "load balancing" of the collective resources of the system.

In one known approach, a master machine is used to distribute the load among the various connected machines. This approach, however, is undesirable because if the master machine fails, the load can no longer be balanced. Another known load balancing technique is based on remote procedure calls (RPCs). In this type of system, a set of shared procedures is distributed across similar types of machines. The procedures are designed to be separately compiled on the host machine. Before they can be accessed, the procedures are first registered with an RPC database that is resident on each machine. This approach is complex because it requires each machine in the processing group to know that address of each procedure available in the processing cluster. It further requires the procedure code to be pre-compiled, i.e. to exist in executable form, on the host, which consumes processing resources. Yet another approach to load balancing exists in platform-specific architectures, wherein pre-compiled code is run on machines that are similarly configured. That approach, however, is limited to homogeneous platforms. Still another approach is to maintain an availability or so-called "load" table for all the member computers of a cluster processing group. That approach requires significant memory and communications overhead.

Thus, there remains a need in the art to provide an improved method and system for load balancing in a distributed computer environment.

BRIEF SUMMARY OF THE INVENTION

A primary object of the present invention is to provide a protocol for aggregating available computer resources into a pool that is managed automatically and made available to users transparently, i.e. without users having to make changes to their systems in order to take advantage of the extra computational power. The inventive protocol preferably is implemented across a set of peer machines that each have an interpreter, e.g., a Java virtual machine. Machines in the pool dynamically bid for the right to interpret methods that require processing.

It is another primary object of this invention to provide a protocol by which a set of computers are transformed into a large, parallel processing cluster of machines that share resources. According to the protocol, as machines become available, they are automatically added to the processing cluster. As machines become unavailable, they are automatically removed from the group.

It is further object of this invention to load balance a set of computer resources in a decentralized manner, i.e. without the need for a central group controller.

A still further object of this invention is to implement load balancing across a processing cluster wherein machines are heterogenous.

Yet another object of the present invention is to provide a cluster-based processing group whose computational capabilities increase as needed to address system loads.

It is another object of this invention to provide a distributed processing architecture wherein if one of the machines in the group becomes unavailable, any of the other machines can take over the computing requirements of the unavailable machine.

Still another more general object of this invention is to automatically balance workload across all available machines in a processing cluster.

A further object of this invention is to provide a load balancing solution that is platform-independent.

Yet another object of this invention is to provide load balancing within a distributed computer environment that does not require procedures to be pre-compiled or registered on a given machine in the cluster group prior to their execution. Rather, the inventive protocol allows a given peer machine (a "client") to send the code that needs to be executed to another peer machine (the "server") in an uncompiled format so that the server can run any code on the client's behalf, not just code that has been pre-registered and compiled.

These and other objects are achieved in a distributed computing environment in which each of a plurality of peer machines includes an interpreter for interpreting methods written in an interpreted language to platform-specific methods. The interpreter, for example, is a Java virtual machine that has been modified to implement the inventive protocol. The protocol dynamically load balances a process as follows. In response to receiving a new method for interpretation at a first peer machine, the machine profiles the new method to determine whether there is an advantage to sending the new method to another peer machine for interpretation. Thus, for example, it may be advantageous to have the new method interpreted elsewhere because some other peer machine has available CPU cycles, available disk storage, available system memory, or the like. If there is an advantage to having the new method interpreted elsewhere, a given subset of the peer machines bid to interpret the new method on behalf of the first peer machine. The winning machine interprets the method on behalf of first peer machine, and then returns the results back to the first peer machine.

In one preferred embodiment, each peer machine includes a Java virtual machine interpreter that is modified or augmented to execute the inventive cluster protocol. Machines join and/or leave the cluster as their available computing resources (e.g., CPU cycles, disk memory, system memory and the like) become available or unavailable, as the case may be. Each of the "active" machines in the cluster selectively bid to interpret methods designed to be executed on a native machine. As noted above, the inventive protocol preferably profiles a given method that may be executed on another peer machine in the cluster. When a given peer machine decides to export the method to another machine in the cluster, given machines in the cluster bid for the right to execute the method. To facilitate the bidding process, the method preferably is exported, together with its associated profile, to the other machines in the processing group. The requesting machine preferably also includes its bid in the package. According to the present invention, it is not required that the method be supported on the given peer machine prior to the bidding process. In the inventive protocol, as machines become unavailable, they simply do not respond to bid requests. As machines become more heavily loaded, they lose bids.

The present invention may be implemented in various types of distributed environments. Thus, for example, a given set of peer machines may be in a bus topology. In this environment, peer machines broadcast a request for bids to other machines. Alternatively, given machines are connected in a ring topology. In this case, the bid request is issued to a given peer machine and then passed around the ring in a point-to-point manner.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
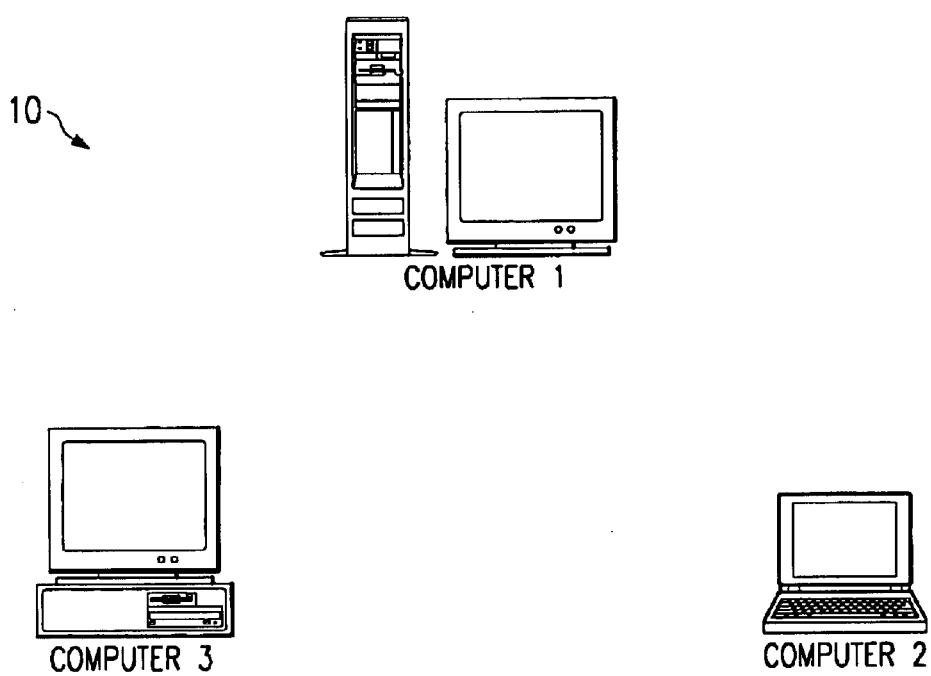
FIG. 1 is a block diagram of a distributed computer environment in which the inventive load balancing protocol is implemented.

FIG. 1 is a block diagram of a distributed computer environment 10 in which the inventive load balancing protocol is implemented. The environment includes three machines, identified as Computer 1, 2 and 3, for ease of illustration. The invention, of course, is designed to be implemented in a distributed environment of any size. Thus, the illustration should not be taken by way of limitation. Moreover, while the environment includes personal computers, this is not a limitation of the invention either. The inventive protocol may be implemented in any computational device that includes an interpreter for executing platform-independent code. The machines are coupled together, for example, by a local area network, a wide area network, the Internet, or the like. One or more of the computers may respond to external requests.

Figure 2:
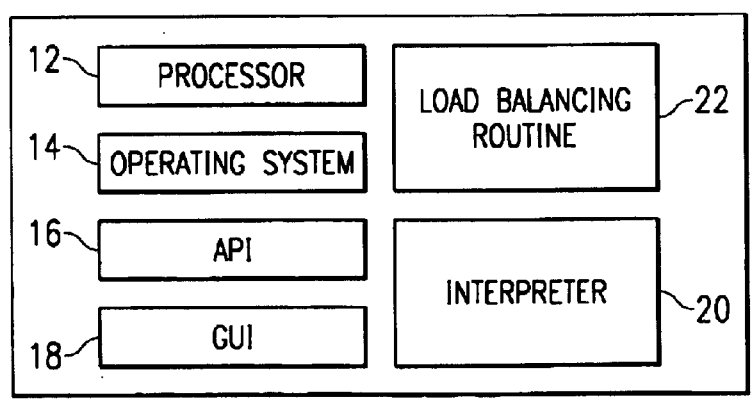
FIG. 2 illustrates a computer for use in implementing the present invention.

Referring to FIG. 2, a computer for use in implementing the present invention is shown. The computer has a processor 12, an operating system 14, an operating system application programming interface (API) 16, a graphical user interface 18, and an interpreter 20, e.g., a Java virtual machine (JVM) interpreter. The process of interpretation is the direct execution of non-machine specific code. A compiler, on the contrary, first converts non-machine specific code to machine specific (executable) code prior to execution. The JVM is an abstract computing machine that includes an instruction set and uses various memory areas. Further details about the JVM may be obtained in *The Java™ Virtual Machine Specification*, Tim Lindholm and Frank Yellin, Addison Wesley (1997), ISBN 0-201-63452-X, which is incorporated herein by reference. Although the present invention is described in the context of Java, this is not a limitation of the invention. The inventive protocol may be implemented in conjunction with any platform independent virtual machine.

Thus, for example, the computer used in the present invention is any personal computer or workstation client or server platform that is Intel-, PowerPC®- or RISCO®-based, and that includes an operating system such as IBM® OS/2®, Microsoft Windows '95, Microsoft Windows NT 4.0, Unix, AIX®, OS/400 or the like. A representative computer runs an Intel x86 processor, the OS/2 Warp Version 4.0 operating system, and JVM Version 1.0.2 or higher. Alternatively, the computer runs an x86 processor, the Windows '95 (or Windows NT) operating system, and JVM Version 1.0.2 or higher. Yet another alternative is to run a computer having a PowerPC or RISC-based processor, the AIX operating system, and JVM 1.0.2 or higher. Further, the invention is not limited to use in personal computers. Recently, the computer industry has sought to add computer processing and communications capabilities to devices other than what would normally be considered a traditional computer. Such devices are quite varied and include, for example, handheld or palmtop computers, personal digital assistants (PDAs), smart appliances, smartphones, peripherals, and the like. The inventive thus may be implemented in any such "pervasive" computing client device. A representative pervasive client is x86-, PowerPC®- or RISC-based, includes a runtime operating system such as WindRiver VXWorks™, QSSL WNX4™, or Microsoft Windows CE, and includes a Web browser having an Java-based interpreter.

According to the invention, an interpreter is modified or augmented to include the inventive load balancing routine 22. Preferably, each machine in the cluster executes the routine 22 as a background task and thus, given machines are able to join or leave the processing cluster automatically. The routine 22 is preferably implemented in software and, more particularly, is written in Java for execution by the Java virtual machine interpreter 20. The routine may be implemented as an applet, a servlet, or the like. Although the routine 22 is preferably Java-based, this is not a requirement of the present invention.

The given computers that comprise the cluster of processing machines may be interconnected over a network (e.g., the Internet, an intranet, a wide area network (WAN) or local area network (LAN)). Thus, a machine running the present invention has appropriate networking hardware to establish a connection to another computer. For example, the machine may have a TCP/IP or NETBIOS connection to a network running over a token ring or Ethernet adapter.

The load balancing routine 22 profiles method calls and facilitates execution of a bidding protocol whereby machines "bid" for the right to execute methods on behalf of other peer machines in the group. In particular, when a method is called at a given machine (sometimes referred to as a "requesting" machine), the interpreter evaluates the call to determine whether it is desirable to export the call to another machine in the cluster (sometimes referred to as a "servicing" machine). This is done by profiling the call based on run-time information and then comparing the estimate of how long it will take to execute the call to some threshold (measured, for example, in seconds or portions thereof) based on the overhead required to export the request to execute the code to all the other machines in the cluster. One simple technique for profiling the function is to count the number of instructions in the function, multiply it by the number of times those instructions will be executed, and then multiply the result by the number of instructions per second that the processor is currently capable of managing. This provides an average total execution time for the function. Of course, other formulas may be used to generate the profile.

If it would take longer to export the call than to simply execute it locally, then the machine executes it locally. If, however, it would take a substantial amount of time to execute locally, then the machine checks to see if there is a faster machine available that might be willing to execute the code. If the machine decides to export the code, the routine 22 packages it in such a way (e.g., by marshaling) that the servicing machines can unpack the method to be executed and its parameters, execute the method, and send back the results. Preferably, the requesting machine exports the Java byte codes comprising the method, together with the profile.

Once a method is packaged for export, it is sent to other machines in the group. A servicing machine examines the execution profile of the method and estimates how long it would take to execute given that machine's available resources (e.g., CPU cycles, disk storage, system memory, and the like). This estimate becomes its bid. In a simple case, the profile indicates how many instructions are needed to execute. The servicing machine knows how many instructions it can execute per second. Thus, it multiplies the number of instructions to be executed by the number of instructions per second that it can execute to generate its bid. Of course, other formulas may be used to generate the actual bid which is preferably a time estimate. The servicing machine preferably then stores the code until it determines whether it won the bid. Alternatively, the servicing machine can begin executing the code, e.g., if it is not otherwise processing any local code. When the requesting machine has received all the bids, the routine 22 picks a winner and informs the other machines of the servicing machine that has been selected to interpret the method. The winning machine may be the requesting machine. The winning machine then interprets the method and sends the results back to the requesting machine.

Figure 3:
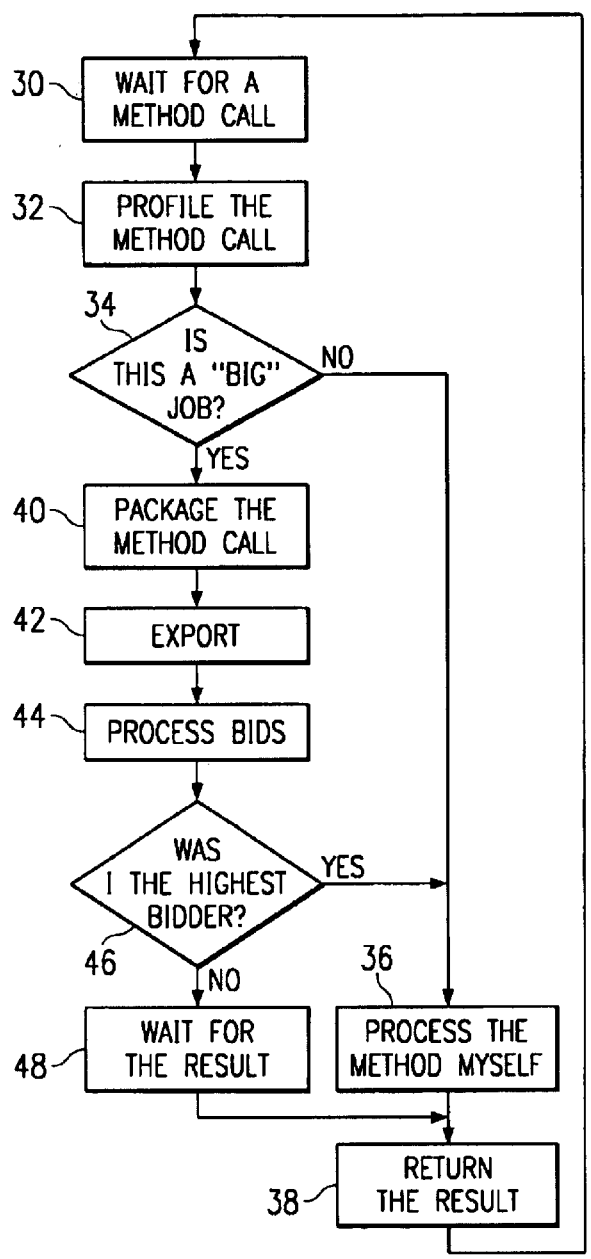
FIG. 3 is a flowchart illustrating the processing steps that occur on a requesting machine.
Figure 4:
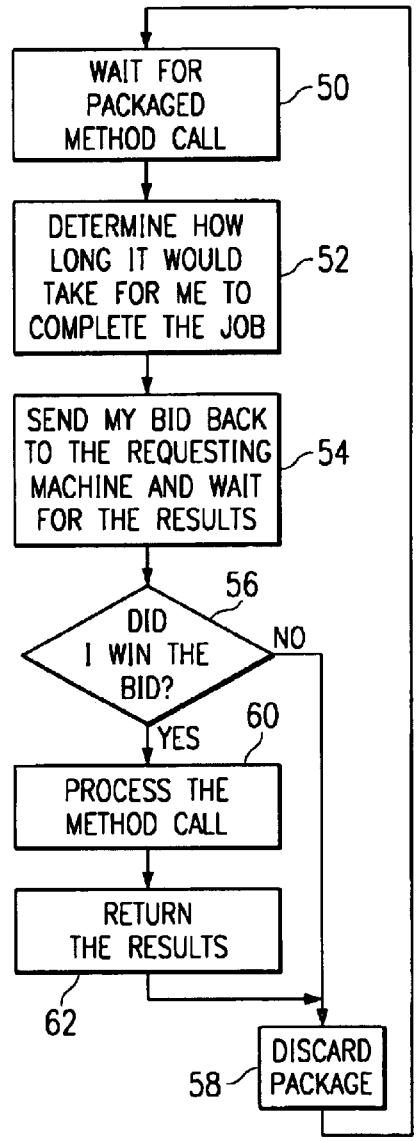
FIG. 4 is a flowchart illustrating the processing steps that occur on a servicing machine.

The load balancing routine 22 preferably operates on each machine in the cluster. FIG. 3 is a flowchart illustrating the process flow on a requesting machine, and FIG. 4 is a flowchart illustrating the process flow on a servicing machine. Of course, a given machine in the cluster can function as either a requesting machine or a servicing machine, or both, as the case may be, depending on the availability or unavailability of its local resources.

Referring now to FIG. 3, the routine begins at step 30 by waiting for a method call. When a method call occurs, the routine profiles the method at step 32. A test is then performed at step 34 to determine whether the method can be serviced locally. The outcome of this test, of course, depends on the size of the method, the current load on the machine, and the like. If the outcome of the test at step 34 indicates that the method can be serviced locally, the routine branches to step 36 to process the request. The results are then returned at step 38.

If, however, the outcome of the test at step 34 indicates that the method should be exported, the routine continues at step 40 to package the method call. The package preferably includes all the code (namely, the Java byte codes) necessary to execute the method call, its parameters, and the profiling information. At step 42, the package is exported to a set of one or more other peer machines. The routine then continues at step 44 to process the bids received from the other machines. A test is then run at step 46 to determine whether the requesting machine won the bidding protocol. Thus, for example, the requesting machine compares all of the received bids with its own bid to determine whether the requesting machine won the bidding protocol. If so, the method is best executed locally, and thus the routine returns to step 36. If, however, some other machine has the best bid, the routine continues at step 48 to wait for the results, which are then returned at step 38. This completes the processing.

FIG. 4 illustrates the process flow at a given servicing machine. The routine begins at step 50 by waiting for a packaged method call. When a package is received, the routine continues at step 52 to determine how long it would take for the machine to interpret the method. This typically depends on the length of the job and how busy the machine is at the time. At step 54, the servicing machine sends the requesting machine a bid and waits for the result. A test is then performed at step 56 to determine whether the servicing machine won the bidding process. If not, the routine branches to step 58 and discards the package. Alternatively, the servicing machine caches the package for possible reuse in the future. If the outcome of the test at step 56 is positive, the machine services the method call (i.e. interprets the Java byte codes according to the parameters passed in the package) at step 60. The results are then returned to the requesting machine at step 62. This completes the processing.

Figure 5A:
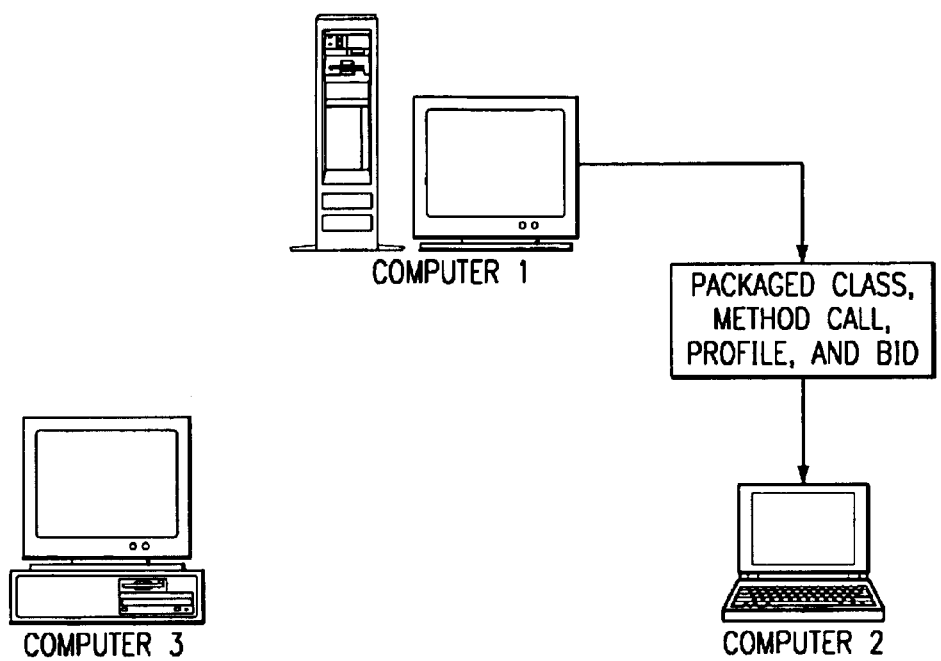
FIGS. 5A–5E illustrate the protocol as implemented within a ring topology.
Figure 5B:
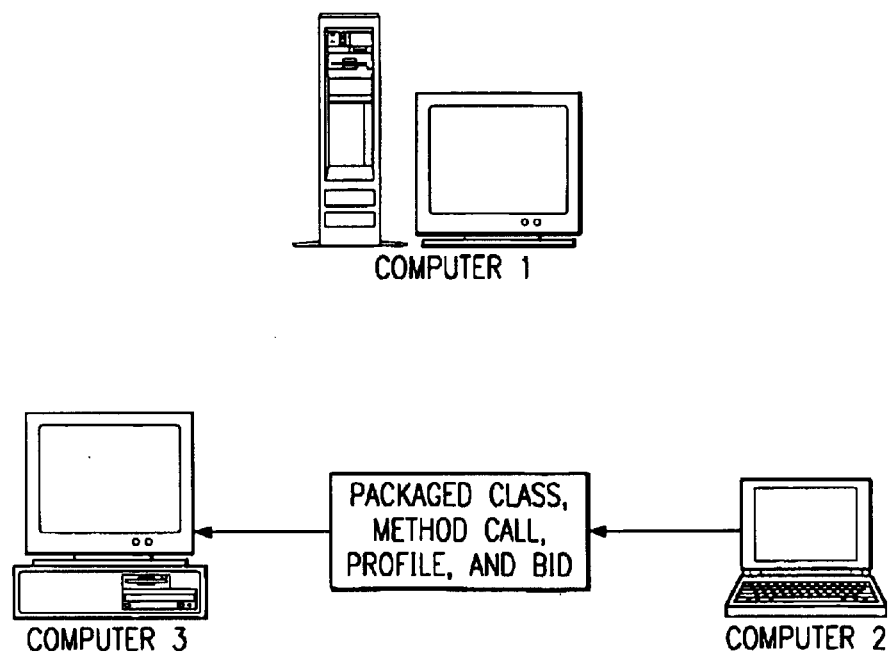

FIGS. 5A–5E illustrate the inventive technique in a ring topology. In FIG. 5A, Computer 1 is about to invoke a method belonging to a Java class. It profiles the method call using the runtime information available and determine that it will take about 30 seconds to execute the code. As a result, the load balancing routine determines that it might be desirable to export the method out to another computer for execution. Thus, Computer 1 packages the method call and its own bid and sends the package to Computer 2. As seen in FIG. 5B, Computer 2 examines the profile and based on its load determines that it can execute the method in about 45 seconds It knows it will lose the bid so it just sends the package to Computer 3, along with the bid from Computer 1.

Figure 5C:
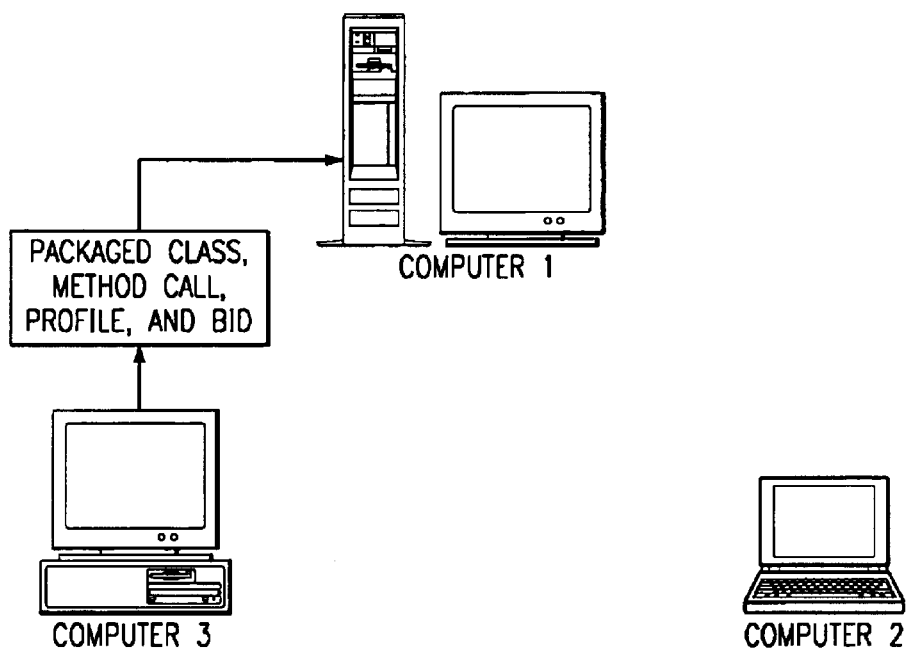
Figure 5D:
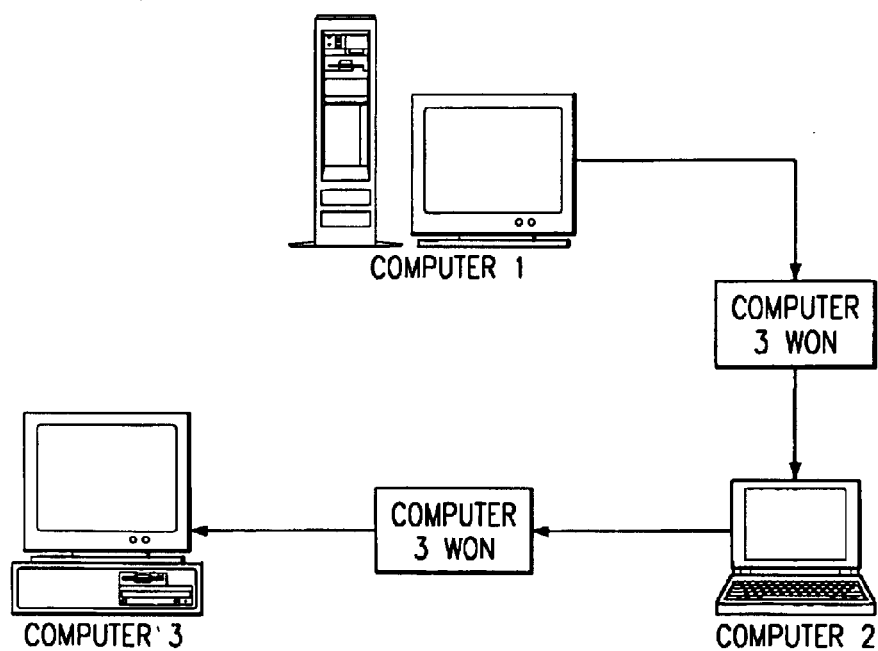
Figure 5E:
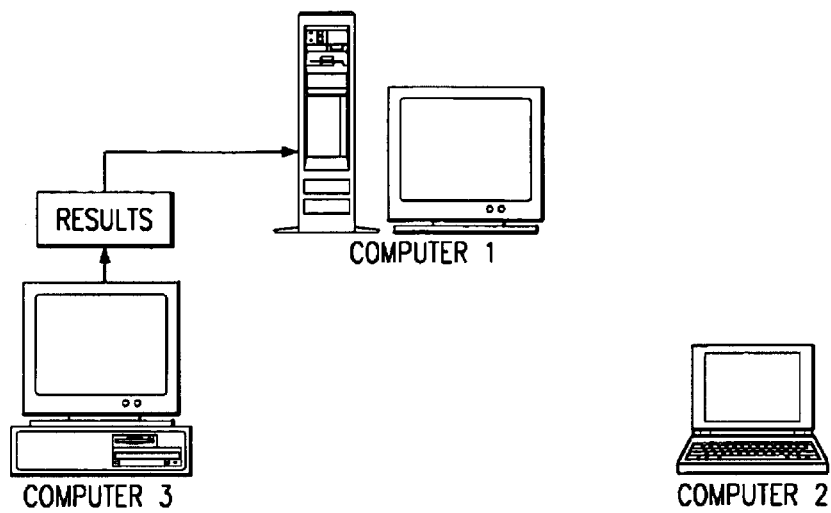

As seen in FIG. 5C, Computer 3 examines the profile and based on its load determines that it can execute the method in about 10 seconds. It knows that it is winning the bidding protocol thus far, so it stores the code and sends the package back to Computer 1, along with its bid. The routine then continues as shown in FIG. 5D. In particular, Computer 1 determines that Computer 3 has won the bid, so it issues a notice to that effect to the other machines and then waits for the results to be returned. As seen in FIG. 5E, Computer 3 sees that it has won the bid, so it executes the method and sends the results back to Computer 1.

Figure 6:
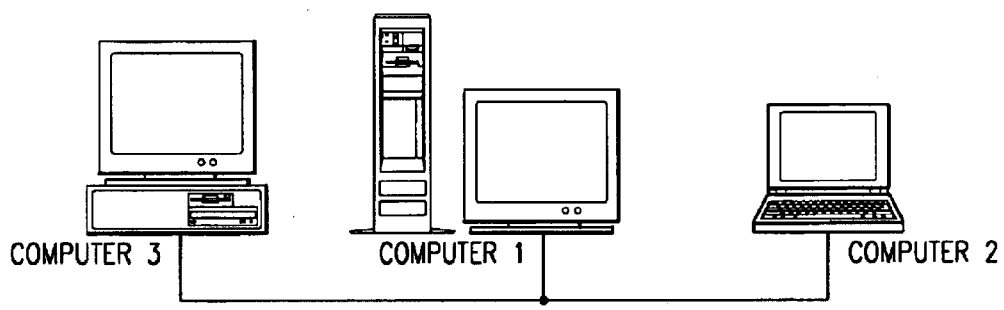
FIG. 6 illustrates the protocol as implemented in a bus topology.

FIG. 6 illustrates the inventive protocol implemented in a bus topology. In this topology, the initial request for work is broadcast simultaneously to all of the members of the computing group. Responses may also be broadcast so that a given computer knows whether or not it has won the bid without necessarily having to be told by the requesting machine. Whether or not particular machines receive the broadcast and/or respond does not affect the protocol.

Figure 7:
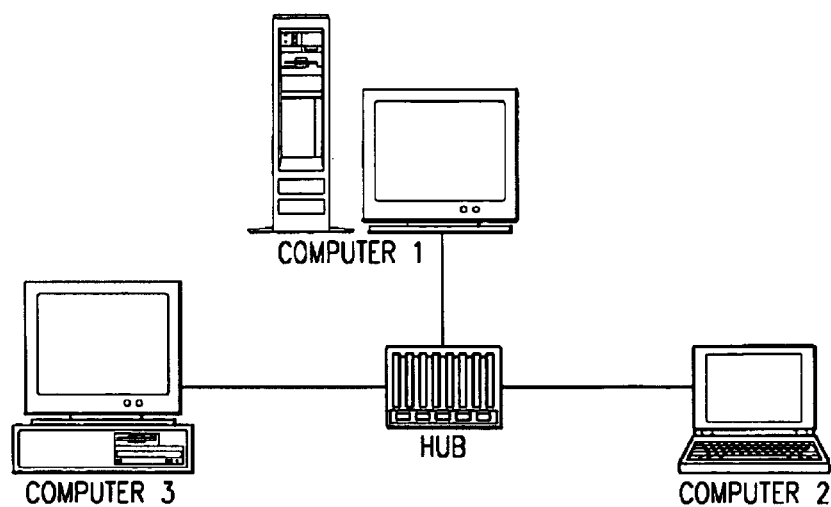
FIG. 7 illustrates the protocol as implemented in a star topology.

FIG. 7 illustrates the inventive protocol implemented in a star topology. In this environment, the computers preferably communicate with each other through a central hub 80. This allows for unicasting (i.e. talking to a single computer at a given time), multicasting (i.e. talking to a subset of computers), and broadcasting (i.e. talking to all computers in the group) at one time. If desired, the hub 80 may be used to resolve the bids, which reduces some of the overhead for the individual computers.

Thus, the machines in the cluster may be arranged in a logical ring with the packaged method being sent sequentially through the ring until the packaged method gets back to the original machine, or in a bus where the method is broadcast and the original machine waits a predetermined amount of time to receive bids. There are advantages and disadvantages to both methods in terms of communications overhead, but the choice of communications protocol is independent from the inventive protocol. Of course, a logical ring may be implemented on top of a physical bus and vice versa.

The present invention provides numerous advantages over the prior art. As described above, the invention is a system and method for obtaining dynamic, decentralized, transparent, platform-independent, scalable, highly available, balanced, parallel processing groups of computational devices. Each of these characteristics are defined as follows in the context of this invention:

Dynamic—As machines become available, preferably they are automatically added to the group. As machines become unavailable, preferably they are automatically removed from the group. Both of these actions are done without human intervention or administration. The size of the group can increase and decrease dynamically. There is no need to notify members of the group's size or membership.

Decentralized—There is no central group controller and no need for any such controller. Preferably, all the machines act independently and are peers of one another. Any machine can ask any other machine to execute code on its behalf. No one machine need be in charge of distributing the workload across the group.

Transparent—Neither the programmer nor the end user need to do anything special to have the code execute on multiple machines. The code does not have to be modified in any way, and the end user does not have to do anything to take advantage of the clustering because the inventive protocol is handled by the interpreter (as modified according to the present invention) at runtime. The author of the Java code need not be aware of the fact that he or she is invoking a remote procedure (namely, a remote peer machine) to interpret the method.

Platform Independent—The machines do not have to be of a particular brand or kind. The only requirement is that they be able to interpret a common processing language. Thus, in the preferred embodiment, the machine interpreters need only know how to interpret Java byte code.

Scalable—As the computational needs of any one machine increase, the system automatically distributes the workload among all the machines in the group, up to the limits of the group, the size of which can grow without bounds. Therefore, the computational capabilities of the group can increase as needed (scale) without bounds. As new machines become available, they insert themselves into the processing group, and the processing group can grow theoretically without bounds. In practice, it may be desired to have hierarchical subdivisions of groups with bridges into other groups of processors or some other way of limiting the number of processors that can join a group to manage the communication overhead.

Highly Available—As noted above, preferably all of the machines are peers. If any machine becomes unavailable, all the other machines can over its computational responsibilities. The inventive protocol may be modified to distribute copies of the entire applet or application to other members of the group. If only one machine is executing code on behalf of another machine and the machine executing the code becomes unavailable, the originator can time-out based on the executing machine's estimate of how long it would take to complete the work. The originator can then choose to execute the code locally or re-send the code the processing group where the machine that has become unavailable will not participate in the bid and machines that are still available will. If one of the machines in the group becomes unavailable, any of the other machines can then take over the computing requirements of the unavailable machine.

Balanced—The workload is automatically balanced between all available machines. Load balancing is achieved at the method call level. When projected execution of a method exceeds a threshold, the method may be exported out to every available machine in the processing group. The machine best suited for executing the code wins the bid, so the balancing is automatic. Additionally, this system does not require tables to be kept of the loads of all the machines in the system. Keeping availability tables updated can be an expensive operation.

Parallel Processing—Java allows parallel execution of threads. To the JVM, imported code (from another machine in the cluster group) is treated like any other method call. Thus, several threads execute on separate machines, however, such execution is transparent to the user or, as noted above, the programmer. All of the machines in the group can be executing the same code simultaneously and the results merged in a programmer-defined way.

Computational Device—According to the invention, any device that is connected to other devices running the modified Java interpreter can participate in the cluster.

The present invention is advantageous in any type of distributed operating environment. For example, assume that during the night a given Web server may receive a large number of requests and have the need to execute server side applications in response to Web user activities. In such an environment, the present invention may be used to alleviate some of the load of the Web server by merely having given computer users leave their computers on and connected to the network when they leave the office. With the inventive protocol, the entire office full of computers is transformed into a large, parallel processing cluster of machines that could share the task of supporting the Web user activities.

One of the preferred implementations of the invention is as a set of instructions in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different network architectures with the spirit and scope of the appended claims. Moreover, the inventive diagnostic technique should be useful in any distributed network environment.

Having thus described my invention, what I claim as new and desire to secure by letters patent is set forth in the following claims.

What is claimed is:

1. In a distributed computing environment in which each of a plurality of peer machines includes an interpreter, a method for dynamically load balancing work over a plurality of machines, comprising the steps of:
   in a first machine, responsive to receiving a new method for interpretation, profiling the new method to determine whether there is an advantage to sending the new method to a second peer machine for interpretation;
   in the first peer machine, responsive to positive determination, sending the new method to the second peer machine;
   in the second peer machine, interpreting the new method; and
   sending results back to the first peer machine.

2. The method as described in claim 1 wherein a profile of the new method is sent to the second peer machine together with the new method.

3. The method as described in claim 1 wherein the interpreter operates on a virtual machine.

4. The method as described in claim 1 wherein there is an advantage to sending the new method to a second peer machine for interpretation because the second peer machine has available CPU cycles.

5. The method as described in claim 4 wherein there is an advantage to sending the new method to a second peer machine for interpretation because the second peer machine has available disk storage.

6. The method as described in claim 4 wherein there is an advantage to sending the new method to a second peer machine for interpretation because the second peer machine has available memory.

7. In a distributed computing environment in which each of a plurality of peer machines includes an interpreter for interpreting methods written in a interpreted language to platform-specific methods, a method for dynamically load balancing a process over a plurality of machines, comprising the steps of:
   in a first peer machine, responsive to receiving a method for interpretation, profiling the method to determine whether there is an advantage to exporting the method to another peer machine for interpretation;
   if so, exporting the method together with its profile to a given subset of the peer machines;
   having the given subset of the peer machines bid to interpret the method on behalf of the first peer machine; and
   executing the method on a selected peer machine whose bid satisfies a given condition.

8. The method as described in claim 7 wherein the peer machine is selected from the given subset of peer machines.

9. The method as described in claim 8 wherein the method begins to be executed on the selected peer machine before a bidding protocol is complete.

10. The method as described in claim 7 wherein the selected peer machine is the first peer machine.

11. The method as described in claim 7 wherein the first machine exports its bid together with the method and the profile.

12. In a distributed computing environment in which each of a plurality of peer machines includes a Java virtual machine, a method for dynamically load balancing a process over a plurality of machines, comprising the steps of:
    in a first peer machine, responsive to receiving a new Java method for interpretation, generating a profile of the new Java method to determine whether there is an advantage to sending the new Java method to another peer machine for interpretation;
    if so, exporting a package to a given subset of the peer machines, the package comprising the new Java method, its associated profile, and a bid generated by the first peer machine; and
    having the given subset of machines bid to interpret the new Java method on behalf of the first peer machine.

13. The method as described in claim 12 further including the steps of:
    interpreting the new Java method at a given peer machine; and
    returning results back to the first peer machine.

14. The method as described in claim 13 wherein the new Java method is not supported on the given peer machine prior to the bid.

15. The method as described in claim 12 wherein the given subset of peer machines are connected to the first peer machine in a bus topology and the method further includes the step of having the first peer machine broadcast a request for bids to the given subset.

16. The method as described in claim 12 wherein the given subset of peer machines are connected to the first peer machine in a ring topology and the method further includes the step of having the first peer machine issue a request for bids to a first given machine in the given subset, wherein each of the machines in the given subset then pass the request in a point-to-point manner.

17. The method as described in claim 12 wherein the given machine has a given resource whose relative load is less then that of each of the other machines in the given subset.

18. The method as described in claim 17 wherein the given resource is available CPU cycles.

19. A computer program product for use in a computer connected in a peer-to-peer relationship with a set of other computers, the computer supporting an interpreter, comprising:
    means responsive to receiving a new method for interpretation for profiling the new method to determine whether there is an advantage to sending the new method to a second peer machine for interpretation; and
    means responsive to a positive determination for issuing a request for bids to the set of other computers to iditnify a given computer for interpreting the new method on behalf of the computer; and
    means responsive to receipt of bids from a given subset of the other computers for selecting a given computer to interpret the method.

20. The computer program product as described in claim 19 wherein the new method is sent to the selected computer together with a profile of the new method.

21. The computer program product as described in claim 19 wherein the interpreter in a Java virtual machine.

22. A method in a first machine for load balancing work, the method comprising:
 responsive to receiving a call for a process, determining whether to export the process for remote processing;
 responsive to a determination that the process is to be exported, sending uncompiled code for the process to a second machine to form exported uncompiled code; and
 receiving a response from the second machine, wherein the response includes a result from processing the exported uncompiled code for the method at the second machine.

23. The method of claim 22, wherein the uncompiled code is for a method.

24. The method of claim 23, wherein the second machine processes the method by interpreting the method.

25. The method of claim 22, wherein parameters used in processing the exported uncompiled code are sent with the exported code to the second machine.

26. The method of claim 23, wherein the profiling step is performed by a load balancer in the first machine.

27. A data processing system in a first machine for load balancing work, the data processing system comprising:
 determining means, responsive to receiving a call for a process, for determining whether to export the process for remote processing;
 sending means, responsive to a determination that the process is to be exported, for sending uncompiled code for the process to a second machine to form exported uncompiled code; and
 receiving means for receiving a response from the second machine, wherein the response includes a result from processing the exported uncompiled code for a method at the second machine.

28. The data processing system of claim 27, wherein the uncompiled code is for a method.

29. The data processing system of claim 28, wherein the second machine process the method by interpreting the method.

30. The data processing system of claim 27, wherein parameters used in processing the exported uncompiled code are sent with the exported code to the second machine.

31. The data processing system of claim 28, wherein the profiling means is performed by a load balance in the first machine.

* * * * *

UNITED STATES PATENT AND TRADEMARK OFFICE
CERTIFICATE OF CORRECTION

PATENT NO. : 6,728,961 B1
APPLICATION NO. : 09/282621
DATED : April 27, 2004
INVENTOR(S) : Velasco It is certified that error appears in the above-identified patent and that said Letters Patent is hereby corrected as shown below:

Col. 9, line 55: after "written in" delete "a" and insert --an--.

Col. 10, line 49: before "machines" insert --peer--.

Col. 10, line 64: before "a given" delete "idintify" and insert --identify--.

Col. 11, line 17: after "machine" delete " . " insert a return and the following:
--where the determining step includes:
 profiling the method; and
 determining whether the method can be locally serviced at the first machine based on the profiling of the method.--.

Signed and Sealed this

Thirty-first Day of July, 2007

JON W. DUDAS
*Director of the United States Patent and Trademark Office*